United States Patent
Kawamoto (10) Patent No.: US 11,658,548 B2
(45) Date of Patent: *May 23, 2023

(54) VOICE COIL MOTOR

(71) Applicant: OMRON Corporation, Kyoto (JP)

(72) Inventor: Ryuji Kawamoto, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 68 days.

This patent is subject to a terminal disclaimer.

(21) Appl. No.: 17/396,847

(22) Filed: Aug. 9, 2021

(65) Prior Publication Data

US 2022/0103045 A1 Mar. 31, 2022

(30) Foreign Application Priority Data

Sep. 29, 2020 (JP) .............................. JP2020-163605

(51) Int. Cl.
*H02K 11/225* (2016.01)
*H02K 41/035* (2006.01)
*H02P 25/034* (2016.01)

(52) U.S. Cl.
CPC ....... *H02K 11/225* (2016.01); *H02K 41/0356* (2013.01); *H02P 25/034* (2016.02)

(58) Field of Classification Search
CPC .. H02K 11/225; H02K 41/0356; H02P 25/034
USPC ........................................................ 318/135
See application file for complete search history.

(56) References Cited

U.S. PATENT DOCUMENTS

| 7,501,834 B2 * | 3/2009 | Madni .............. H02K 41/0356 381/400 |
| 2007/0003099 A1 | 1/2007 | Madni et al. |
| 2008/0199039 A1 * | 8/2008 | Bohlender ............... H04R 9/06 381/412 |
| 2020/0413171 A1 * | 12/2020 | Shen ...................... H04R 9/025 |
| 2022/0103057 A1 * | 3/2022 | Kawamoto ........ H02K 41/0354 |

FOREIGN PATENT DOCUMENTS

| JP | H8-247025 A | 9/1996 |
| JP | 2007-6695 A | 1/2007 |

* cited by examiner

*Primary Examiner* — Kawing Chan
(74) *Attorney, Agent, or Firm* — Metrolex IP Law Group, PLLC (57) ABSTRACT

A voice coil motor (VCM) according to one or more embodiments may include a casing, a permanent magnet, a yoke and iron-core, a bobbin, and a coil part. The coil part may include a drive and primary coil serving as a drive coil and a primary coil of a displacement sensor including a differential transformer, the drive and primary coil being interlinked with a magnetic flux by the permanent magnet, and two secondary coils of the displacement sensor. The yoke and iron-core may be disposed in a central space defined in the coil part, and serves as an iron core of the displacement sensor.

9 Claims, 8 Drawing Sheets

VOICE COIL MOTOR

CROSS-REFERENCE TO RELATED APPLICATION

This application is based on Japanese Patent Application No. 2020-163605 filed with the Japan Patent Office on Sep. 29, 2020, the entire contents of which are incorporated herein by reference.

FIELD

The disclosure relates to a voice coil motor, and more specifically to a voice coil motor having a function of detecting a position of a movable side.

BACKGROUND

Heretofore, there are various voice coil motors (hereinafter, occasionally abbreviated as VCMs) such as a vibration generator, a linear motor, a magnetic head drive actuator, and an electric motor. A VCM converts electric energy into kinetic energy, with magnet energy (i.e., a magnetic field) as a medium. A VCM utilizes an operating principle that force is generated in a predetermined direction according to Fleming's left-hand rule when a current flows through a conductor in a magnetic field. Some VCMs include a displacement sensor such as a linear encoder, and have a function of detecting a position of a movable side.

Figure 10:
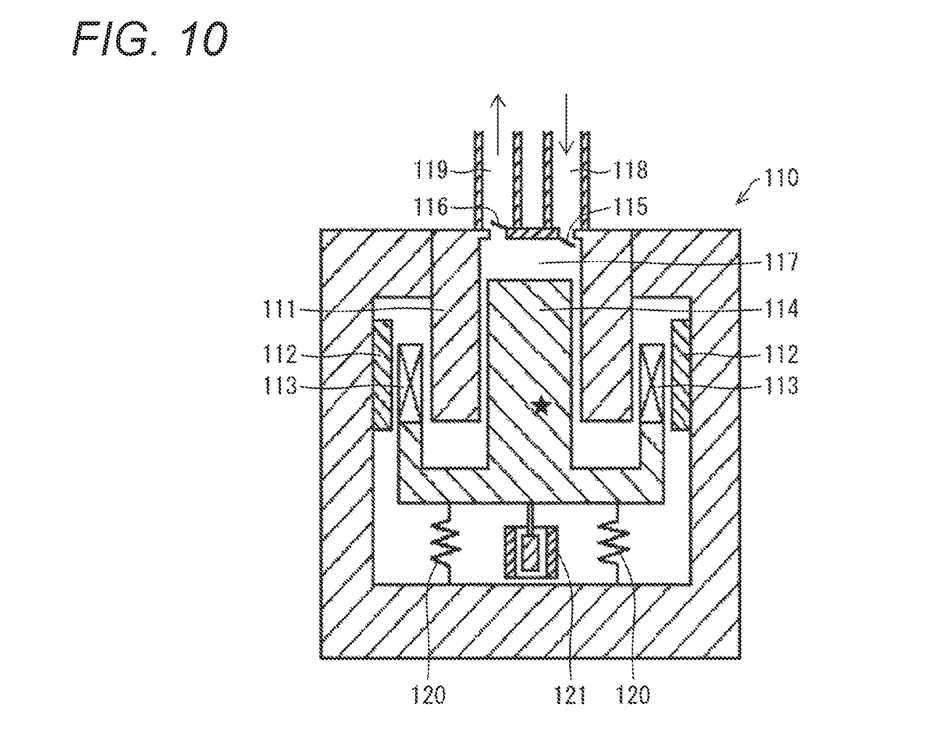
FIG. 10 is a diagram illustrating a sectional view of a vibratory compressor as disclosed in JP 1996-247025 A.

For example, JP 1996-247025 A discloses a vibratory compressor illustrated in FIG. 10. As illustrated in FIG. 10, a vibratory compressor 110 includes a cylinder 111 having a tubular shape and disposed at a center of the vibratory compressor 110, and a permanent magnet 112 having an annular shape and surrounding the cylinder 111. The vibratory compressor 110 also includes an annular coil 113 disposed between the permanent magnet 112 and the cylinder 111. The annular coil 113 acts on the permanent magnet 112 to move in an axial direction of the cylinder 111. The vibratory compressor 110 also includes a compression piston 114 housed in the cylinder 111. The compression piston 114 defines a compression chamber 117 provided with a suction valve 115 and a discharge valve 116. The compression piston 114 is connected to the annular coil 113 to move axially in the cylinder 111. The vibratory compressor 110 also includes a suction pipe 118 to which the suction valve 115 is connected, and a discharge pipe 119 to which the discharge valve 116 is connected. The vibratory compressor 110 also includes a resonance spring 120.

The permanent magnet 112 generates a magnetic field between the permanent magnet 112 and the cylinder 111. When an alternating current is fed to the annular coil 113 between the permanent magnet 112 and the cylinder 111, a thrust that vibrates in accordance with a frequency of the alternating current thus fed is applied to the annular coil 113. The annular coil 113 thus axially drives the compression piston 114 connected thereto. The vibratory compressor 110 also includes a displacement detector 121 (corresponding to a displacement sensor) including, for example, a differential transformer axially connected to the compression piston 114. The displacement detector 121 detects a displacement of the compression piston 114.

Meanwhile, J P 2007-006695 A discloses a voice coil actuator including a capacitive sensor (corresponding to a displacement sensor) for measuring a relative movement, a relative position, and/or a relative acceleration between a permanent magnet housing and a coil assembly.

According to the vibratory compressor 110 disclosed in JP 1996-247025 A, the displacement detector 121 is mounted as a completely separate component in the vibratory compressor 110 as illustrated in FIG. 10. According to the voice coil actuator disclosed in JP 2007-006695 A, likewise, the capacitive sensor is mounted as a completely separate component in the voice coil actuator although not illustrated. These displacement sensors each mounted as a completely separate component cause enlargement of an outer shape of a VCM and increase in cost.

SUMMARY

A voice coil motor according to one or more embodiments may be capable of detecting a displacement without enlargement of its outer shape or increase in cost.

Accordingly, one or more embodiments may adopt the following configurations.

Specifically, a voice coil motor according to one or more embodiments may include: a casing having a bottom end-closed cylindrical shape; a permanent magnet having a cylindrical outer peripheral face, the permanent magnet being disposed on a central bottom portion in the casing; a yoke disposed opposite the permanent magnet in the casing, the yoke being equal in diameter to the permanent magnet; a bobbin; and a coil part wound around the bobbin. The coil part may include: a drive and primary coil serving as a drive coil and a primary coil of a differential transformer, the drive and primary coil being interlinked with a magnetic flux by the permanent magnet; and two secondary coils of the differential transformer. The yoke is disposed in a central space defined in the coil part, and serves as an iron core of the differential transformer.

According to the above described configuration, when a drive current is fed to the drive and primary coil, a thrust (Lorentz force) is generated in an axial direction of the drive and primary coil in accordance with Fleming's left-hand rule. As a result, a magnet side including the casing, the permanent magnet, and the yoke and a coil side including the bobbin and the coil part are displaced relatively. In addition, the coil part including the drive and primary coil and the two secondary coils and the yoke disposed in the central space defined in the coil part constitute a displacement sensor including the differential transformer. When the drive and primary coil is driven with an alternating-current power supply, a position of the magnet side relative to the coil side is detected from a difference between voltages induced in the two secondary coils.

According to the above described configuration, the coil and the yoke in the voice coil motor serve as the primary coil and the iron core for excitation of the differential transformer for detecting a displacement. The differential transformer for detecting a relative position is thus incorporated in the voice coil motor only by addition of two secondary coils as components.

In the voice coil motor according to the foregoing aspect, the two secondary coils may be wound around an outer periphery of the drive and primary coil while being placed on top of the other. According to the above described configuration, the displacement sensor including the differential transformer is incorporated in the voice coil motor without changing an axial size of an outer shape of the voice coil motor.

In the voice coil motor according to the foregoing aspect, the two secondary coils may be wound around axial two ends of the drive and primary coil. According to the above described configuration, the displacement sensor including the differential transformer is incorporated in the voice coil motor without changing a radial size of the outer shape of the voice coil motor.

A drive control device according to one or more embodiments is a drive control device for the voice coil motor according to the foregoing aspect. The drive control device may include: an oscillator configured to generate a high-frequency current; a drive unit configured to amplify a signal that includes a signal indicating a target position of a movable side in the voice coil motor and the high-frequency current superimposed on the signal, the high-frequency current being generated by the oscillator, and to supply the signal thus amplified to the drive and primary coil; a processing unit configured to receive voltages to be induced in the two secondary coils of the voice coil motor, and to output a position signal indicating a position of the movable side, based on each of the voltages; and a correction unit configured to correct a signal indicating the target position, the signal being input to the drive unit, based on the position signal output from the processing unit.

According to the above described configuration, the drive unit amplifies the signal that includes the signal indicating the target position of the movable side and the high-frequency current superimposed on the signal, the high-frequency current being generated by the oscillator, and supplies the signal thus amplified to the drive and primary coil. The processing unit outputs the position signal indicating the position of the movable side, based on the voltages induced in the two secondary coils. In other words, the processing unit outputs the position signal indicating the position of the magnet side relative to the coil side. The correction unit corrects the signal indicating the target position, the signal being input to the drive unit, based on the position signal output from the processing unit.

In the drive control device according to the foregoing aspects, the high-frequency current may have a frequency higher than a response frequency of the voice coil motor. Accordingly, highly accurate position control is achieved since the superimposed high-frequency current causes no displacement of the voice coil motor.

A voice coil motor according to one or more embodiments may be capable of detecting a displacement without enlargement of its outer shape or increase in cost.

DETAILED DESCRIPTION

With reference to the drawings, hereinafter, a description will be given of inventive aspects according to one or more embodiments (hereinafter, also referred to as "the one or more embodiments"). It should be however noted that the one or more embodiments to be described below are merely exemplified in all respects. As a matter of course, various modifications and variations may be made without departing from the intended scope. In other words, specific configurations according to one or more embodiments disclosed herein may be appropriately adapted in embodying the invention.

1. Application Example

Figure 8:
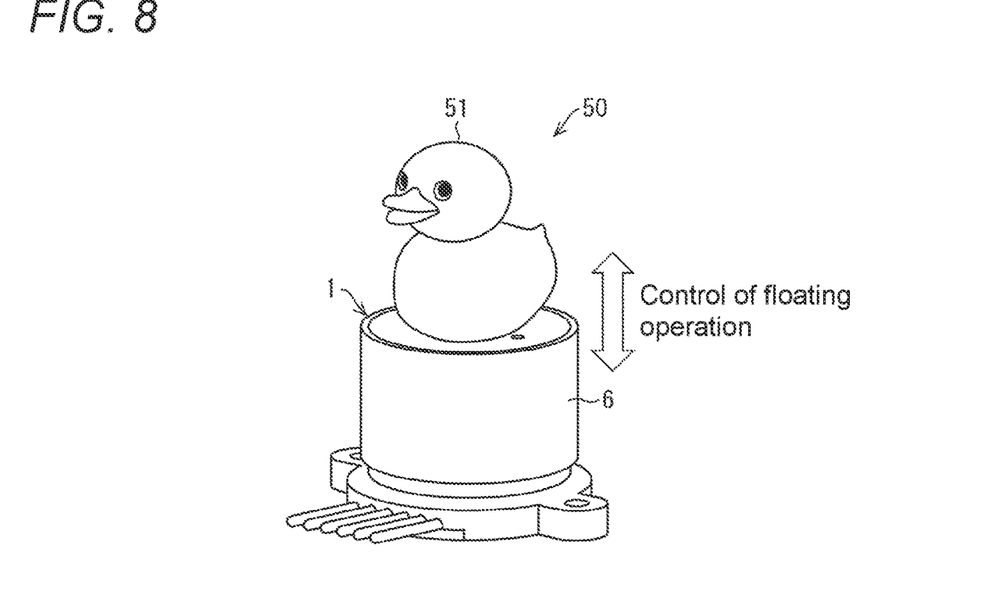
FIG. 8 is a perspective view of a gimmick device including the VCM according to one or more embodiments.
Figure 9:
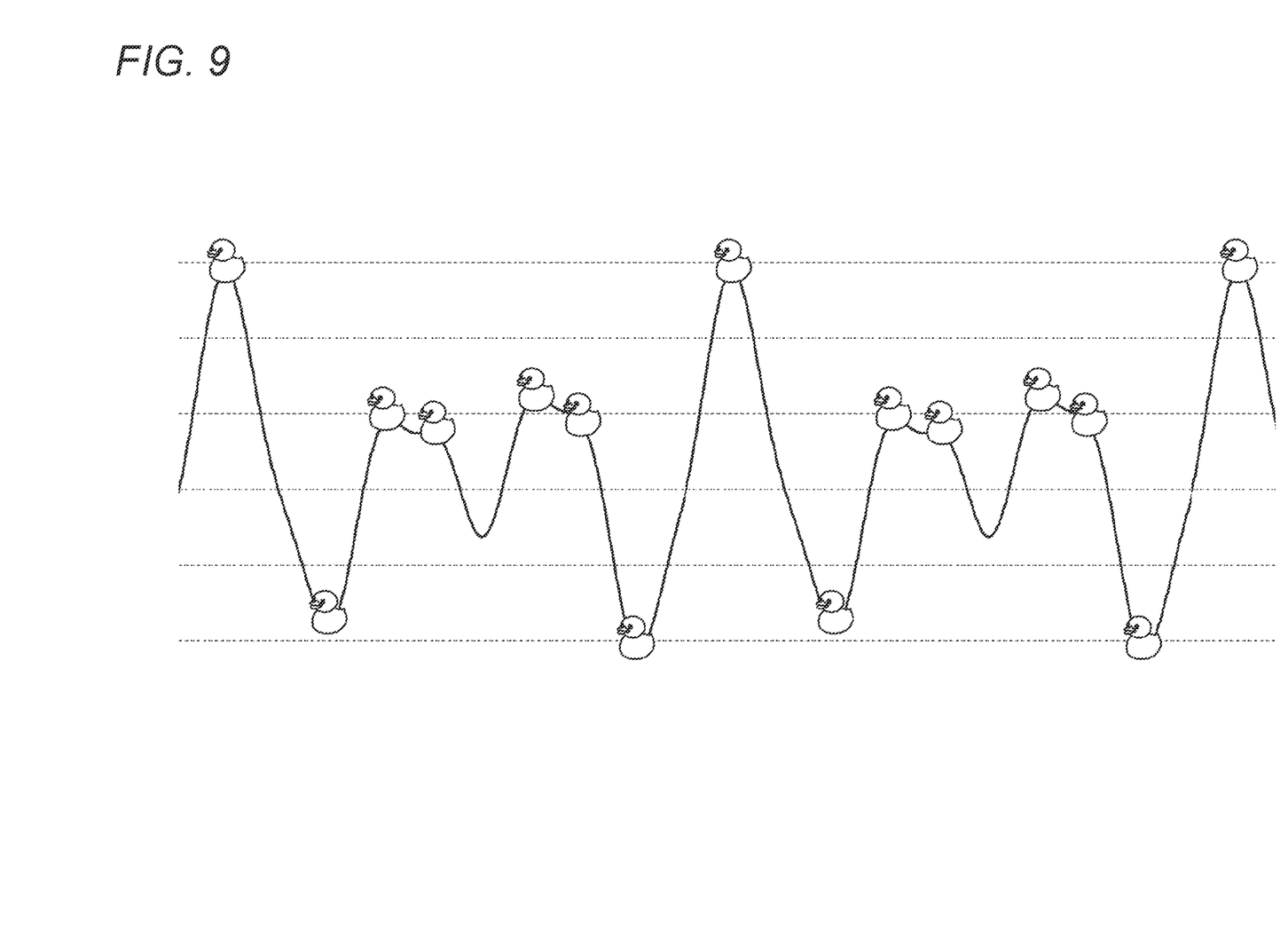
FIG. 9 is a diagram illustrating an image of movement of a gimmick based on the displacement of a movable part in a gimmick device, such as is illustrated in FIG. 8.

First, a description will be given of an exemplary scene to which one or more embodiments is applied. As illustrated in FIG. 8, a voice coil motor (hereinafter, abbreviated as VCM) 1 according to one or more embodiments is usable as a drive device for a gimmick device 50 to be installed in game machines including pachinko, pachinko-slot, and pachinko gaming machines. The VCM 1 uses a component of a VCM main body for a displacement sensor including a differential transformer, thereby detecting a displacement without enlargement of its outer shape and increase in cost. The VCM 1 achieves the gimmick device 50 configured to perform a floating operation that causes a gimmick 51 mounted to a movable part 20 to smoothly move up and down as if floating on the surface of water as illustrated in FIG. 9, for example. The VCM 1 may also be usable in, for example, a haptic controller for electronic sports.

2. Configuration Example

With reference to FIGS. 1 to 9, next, a description will be given of an example according to one or more embodiments.
(Configuration of VCM 1)

Figure 1:
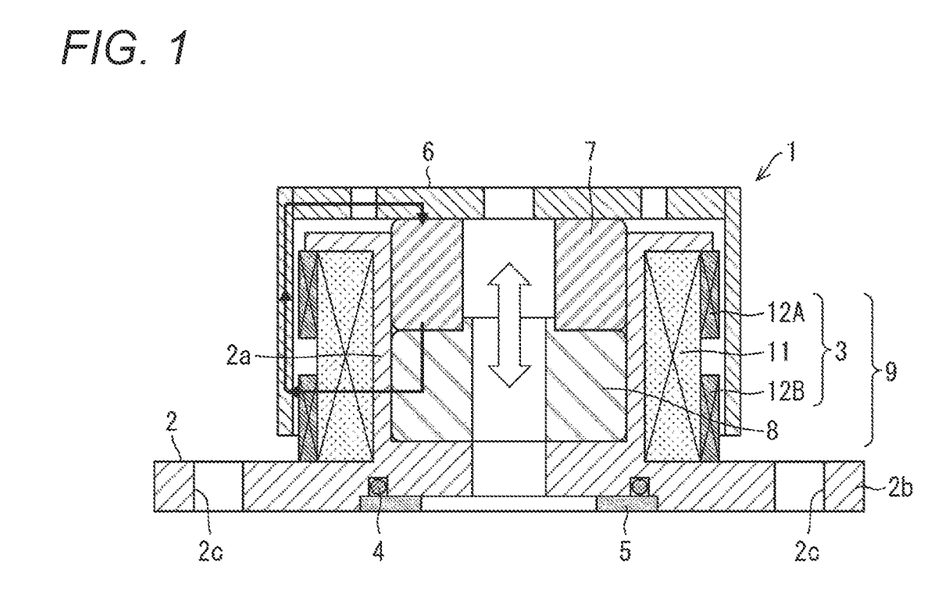
FIG. 1 is a diagram illustrating a longitudinal sectional view of a VCM according to one or more embodiments.
Figure 2:
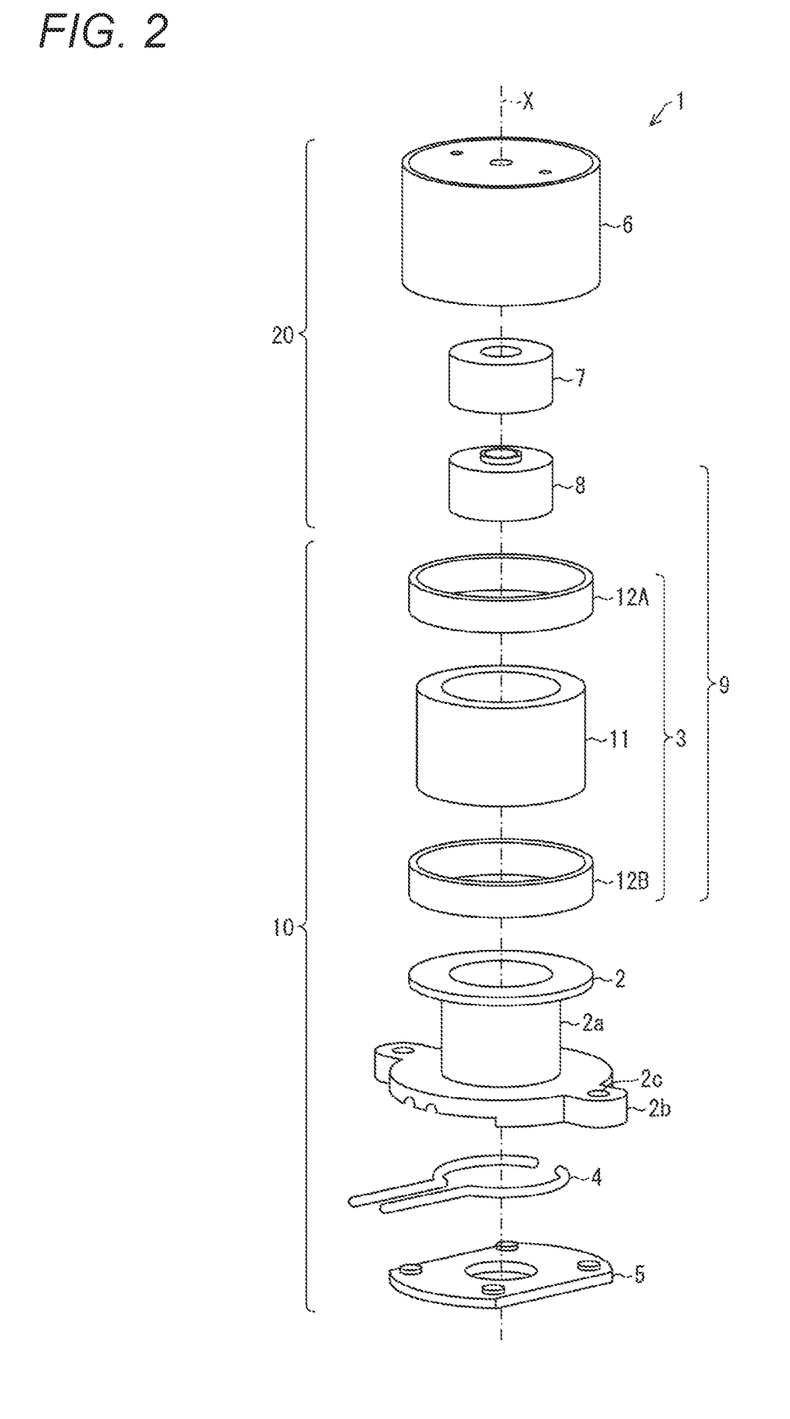
FIG. 2 is a diagram illustrating an exploded perspective view of a VCM according to one or more embodiments.

FIG. 1 is a longitudinal sectional view of the VCM 1 according to one or more embodiments. FIG. 2 is an exploded perspective view of the VCM 1 according to one or more embodiments. As illustrated in FIGS. 1 and 2, the VCM 1 includes a bobbin 2, a coil part 3, a lead wire 4, a back cover 5, a casing 6, a permanent magnet 7, and a yoke and iron-core 8.

The bobbin 2 is a bottom end-closed tubular component around which the coil part 3 is wound. The bobbin 2 is typically made of a resin. The coil part 3 includes a drive and primary coil 11 and two secondary coils 12A and 12B. The coil part 3 is wound around a cylindrical portion 2a of the bobbin 2.

The drive and primary coil 11 serves as a drive coil of the VCM main body to drive the movable part 20 including the permanent magnet 7. The drive and primary coil 11 also serves as a primary coil for exciting a displacement sensor 9 including a differential transformer that detects a position of the movable part 20. The secondary coils 12A and 12B serve as two secondary coils for detecting the displacement sensor 9. As will be described in greater detail hereinafter, the displacement sensor 9 includes the drive and primary coil 11, the two secondary coils 12A and 12B, and the yoke and iron-core 8.

In one or more embodiments, the drive and primary coil 11 is wound around the cylindrical portion 2a, and the two secondary coils 12A and 12B are wound around an outer periphery of the drive and primary coil 11 while being placed on top of the other. The two secondary coils 12A and 12B are arranged side by side in an axial direction. The axial direction refers to a direction of a center axis X of the coil part 3 (see FIG. 2) extending upward and downward (in an up-and-down direction). In the following description, the secondary coil 12A that is located above the secondary coil 12B is referred to as an upper secondary coil 12A, and the secondary coil 12B that is located below the secondary coil 12A is referred to as a lower secondary coil 12B.

The drive and primary coil 11, upper secondary coil 12A, and lower secondary coil 12B of the coil part 3 are soldered to the lead wire 4 at a back side of a bottom portion 2b of the bobbin 2. Each of the drive and primary coil 11, the upper secondary coil 12A, and the lower secondary coil 12B is connected to an external device via the lead wire 4. It should be noted that FIG. 2 illustrates two lead wires 4. The back cover 5 is disposed on the back side of the bottom portion 2b to protect the soldered portion. The bottom portion 2b extends in a flange shape, and has a mount hole 2c bored in the flange portion. The VCM 1 is fastened to, for example, a housing with a screw (not illustrated) inserted into the mount hole 2c. In one or more embodiments, a side including the drive and primary coil 11 is fixed, and the bobbin 2, the coil part 3, the lead wire 4, and the back cover 5 correspond to a fixed part 10.

The casing 6 has a bottom end-closed cylindrical shape, and has a central bottom portion located therein. The permanent magnet 7 having a cylindrical outer peripheral face is disposed on the central bottom portion. The permanent magnet 7 is fixed by adsorption or adhesion to the casing 6.

The yoke and iron-core 8 is disposed opposite the permanent magnet 7 in the casing 6. The yoke and iron-core 8 is fixed by adsorption or adhesion to the permanent magnet 7. The yoke and iron-core 8 is equal in diameter to the permanent magnet 7. The yoke and iron-core 8 serves as a yoke of the VCM main body, and also serves as an iron core of the displacement sensor 9. Each of the casing 6 and the yoke and iron-core 8 is typically made of iron.

In one or more embodiments, each of the permanent magnet 7 and the yoke and iron-core 8 has a ring shape. The permanent magnet 7 and the yoke and iron-core 8 may alternatively have columnar shapes that are equal in diameter to each other. The casing 6, the permanent magnet 7, and the yoke and iron-core 8 correspond to the movable part 20.

The permanent magnet 7 is located at a central portion of the movable part 20 as seen in plan view from the axial direction. The permanent magnet 7 has a magnetization direction that is parallel to the axial direction. The casing 6 and the yoke and iron-core 8 are arranged with the permanent magnet 7 interposed therebetween in the magnetization direction.

The permanent magnet 7 produces a magnetic flux. The magnetic flux passes an air gap G (magnetic gap) via the yoke and iron-core 8, and then returns to the permanent magnet 7 through the casing 6, as indicated by an arrow X in FIG. 1. The drive and primary coil 11 is disposed in the air gap G, and is interlinked with the magnetic flux produced by the permanent magnet 7.

(Operation of VCM 1)

Passing a current through the drive and primary coil 11 interlinked with the air gap G produces an electromagnetic force in a direction according to Fleming's left-hand rule. In the one or more embodiments, since the drive and primary coil 11 is fixed, a side including the permanent magnet 7 acts as the movable part 20 by a reaction force to produce a thrust in the axial direction. On the contrary, the side including the permanent magnet 7 may be fixed, and the side including the drive and primary coil 11 may be made movable.

(Relationship Between Drive Current and Displacement of Movable Part 20)

Figure 3:
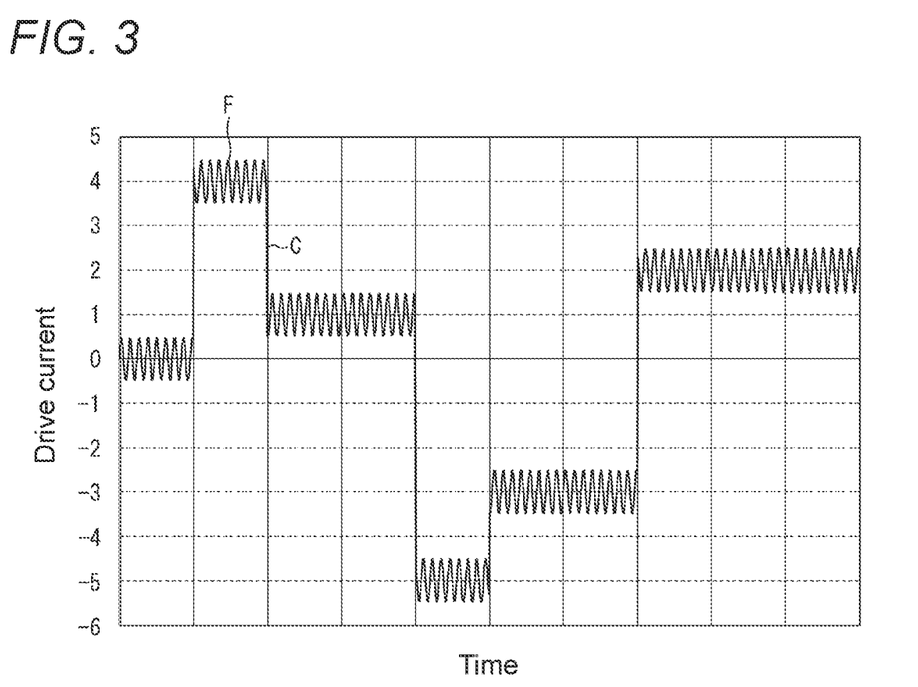
FIG. 3 is a waveform diagram illustrating an exemplary drive current flowing through a drive and primary coil of a VCM according to one or more embodiments.
Figure 4:
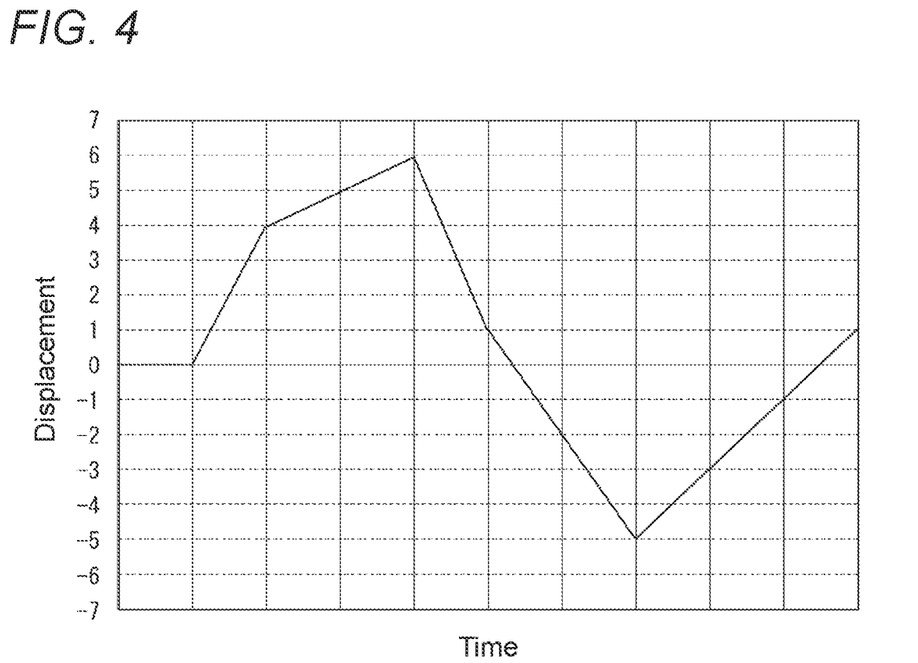
FIG. 4 is a graph illustrating an exemplary displacement of a VCM in which a drive current, such as is illustrated in FIG. 3, flows through a drive and primary coil.

FIG. 3 is a waveform diagram illustrating an exemplary drive current flowing through the drive and primary coil 11 of the VCM 1 according to the one or more embodiments. FIG. 4 is a graph illustrating an exemplary displacement of the VCM 1 (specifically, a displacement of the movable part 20) in a state in which the drive current illustrated in FIG. 3 flows through the drive and primary coil 11.

As illustrated in FIG. 3, a drive current C with a normal rectangular wave for moving the movable part 20 up and down is fed to the drive and primary coil 11, with a high-frequency current F for displacement detection superimposed thereon. In FIG. 3, the vertical axis represents a numeral value that is a current value (an addition current value) to be added to a direct current P for lifting the movable part 20 up from a lower position at which the drive current is zero (see 502 in FIG. 5 to be described later) to a central position (see 500 in FIG. 5). The central position corresponds to a reference position of the displacement of the movable part 20.

As illustrated in FIG. 4, the movable part 20 is held in a position at which its displacement is zero in the state in which the addition current value is zero. When the addition current value is positive, the drive current is larger than the direct current P; therefore, the movable part 20 moves upward from the present position. When the addition current value is negative, the drive current is smaller than the direct current P or flows reversely; therefore, the movable part 20 moves downward from the present position. The movable part 20 has an acceleration upon movement which is proportional to an absolute value of the addition current value. The acceleration increases as the addition current value is larger.

(Displacement Sensor 9)

As illustrated in FIGS. 1 and 2, the displacement sensor 9 configured to detect a position of the movable part 20 includes the drive and primary coil 11, the upper secondary coil 12A, the lower secondary coil 12B, and the yoke and iron-core 8. In the displacement sensor 9, the drive and primary coil 11 and the yoke and iron-core 8 serve as the constituent components of the VCM main body. In other words, the drive and primary coil 11 and the yoke and iron-core 8 are used for both the displacement sensor 9 and the VCM main body. The displacement sensor 9 is equal in operating principle to a differential transformer.

Figure 5:
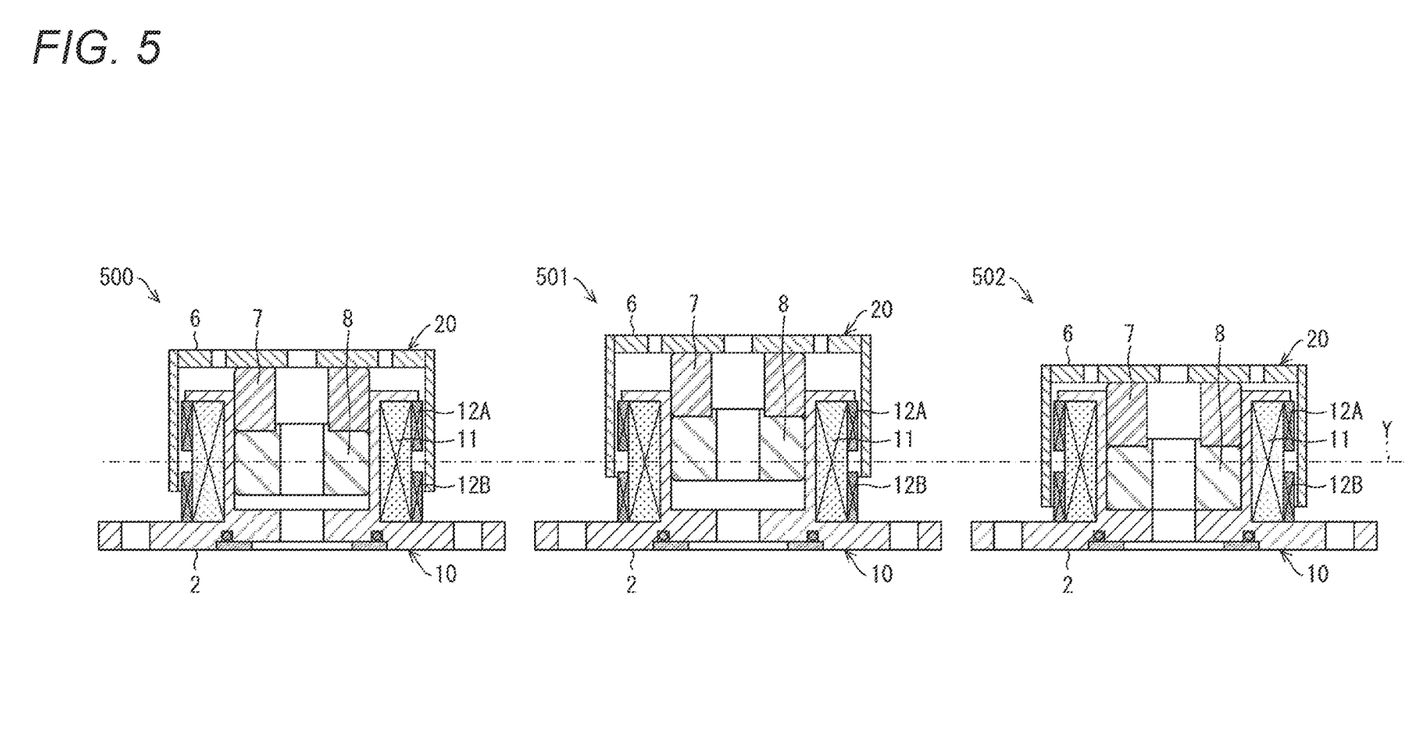
FIG. 5 is a diagram illustrating an operating principle of a displacement sensor in a VCM according to one or more embodiments.

With reference to FIG. 5, a description will be given of the operating principle of the displacement sensor 9. FIG. 5 is a diagram illustrating the operating principle of the displacement sensor 9 in the VCM 1 according to the one or more embodiments. In FIG. 5, a state 500 indicates that the movable part 20 is at the central position, a state 501 indicates that the movable part 20 is at an upper position displaced from the central position, and a state 502 indicates that the movable part 20 is at a lower position displaced from the central position. The central position corresponds to the position at which the addition current value is zero in FIG.

3, and also corresponds to the reference position at which the displacement is zero in FIG. 4.

The drive and primary coil 11 fed with the high-frequency current F superimposed on the drive current C excites a magnetic flux that passes through the yoke and iron-core 8 and then returns to the drive and primary coil 11, which induces voltages in the upper secondary coil 12A and the lower secondary coil 12B. The voltage induced in the upper secondary coil 12A and the voltage induced in the lower secondary coil 12B differ depending on the position of the yoke and iron-core 8.

Specifically, a mutual inductance of each of the upper secondary coil 12A and the lower secondary coil 12B relative to the drive and primary coil 11 changes with a change in relative position between the yoke and iron-core 8 and the coil part 3. In the state 500, the movable part 20 is at the central position, and the yoke and iron-core 8 is in the middle of the coil part 3 in the up-and-down direction. In FIG. 5, a chain line Y indicates the middle of the coil part 3 in the up-and-down direction. In the illustrated state, the mutual inductance of the upper secondary coil 12A relative to the drive and primary coil 11 is equal to the mutual inductance of the lower secondary coil 12B relative to the drive and primary coil 11. Therefore, the output voltage at the upper secondary coil 12A and the output voltage at the lower secondary coil 12B become equal to each other, so that a difference therebetween becomes zero.

In the state 501, the movable part 20 is at the upper position, and the yoke and iron-core 8 is relatively located upward with respect to the middle of the coil part 3 in the up-and-down direction. Accordingly, the mutual inductance of the upper secondary coil 12A relative to the drive and primary coil 11 increases while the mutual inductance of the lower secondary coil 12B relative to the drive and primary coil 11 decreases. A voltage is therefore generated between the upper secondary coil 12A and the lower secondary coil 12B in accordance with a difference between the induced voltage in the upper secondary coil 12A and the induced voltage in the lower secondary coil 12B.

In the state 502, the movable part 20 is at the lower position, and the yoke and iron-core 8 is located relatively downward with respect to the middle of the coil part 3 in the up-and-down direction. Accordingly, the mutual inductance of the upper secondary coil 12A relative to the drive and primary coil 11 decreases while the mutual inductance of the lower secondary coil 12B relative to the drive and primary coil 11 increases. A voltage is therefore generated between the upper secondary coil 12A and the lower secondary coil 12B in accordance with a difference between the induced voltage in the upper secondary coil 12A and the induced voltage in the lower secondary coil 12B. The polarity of the voltage relative to the difference is reversed in the state in which the movable part 20 is at the upper position and in the state in which the movable part 20 is at the lower position.

As described above, there is a difference in induced voltage between the upper secondary coil 12A and the lower secondary coil 12B in accordance with a position of the movable part 20. A voltage signal indicating a displacement of the movable part 20 (hereinafter, referred to as a displacement signal) is therefore obtained from signals output from the upper secondary coil 12A and lower secondary coil 12B.

Figure 6:
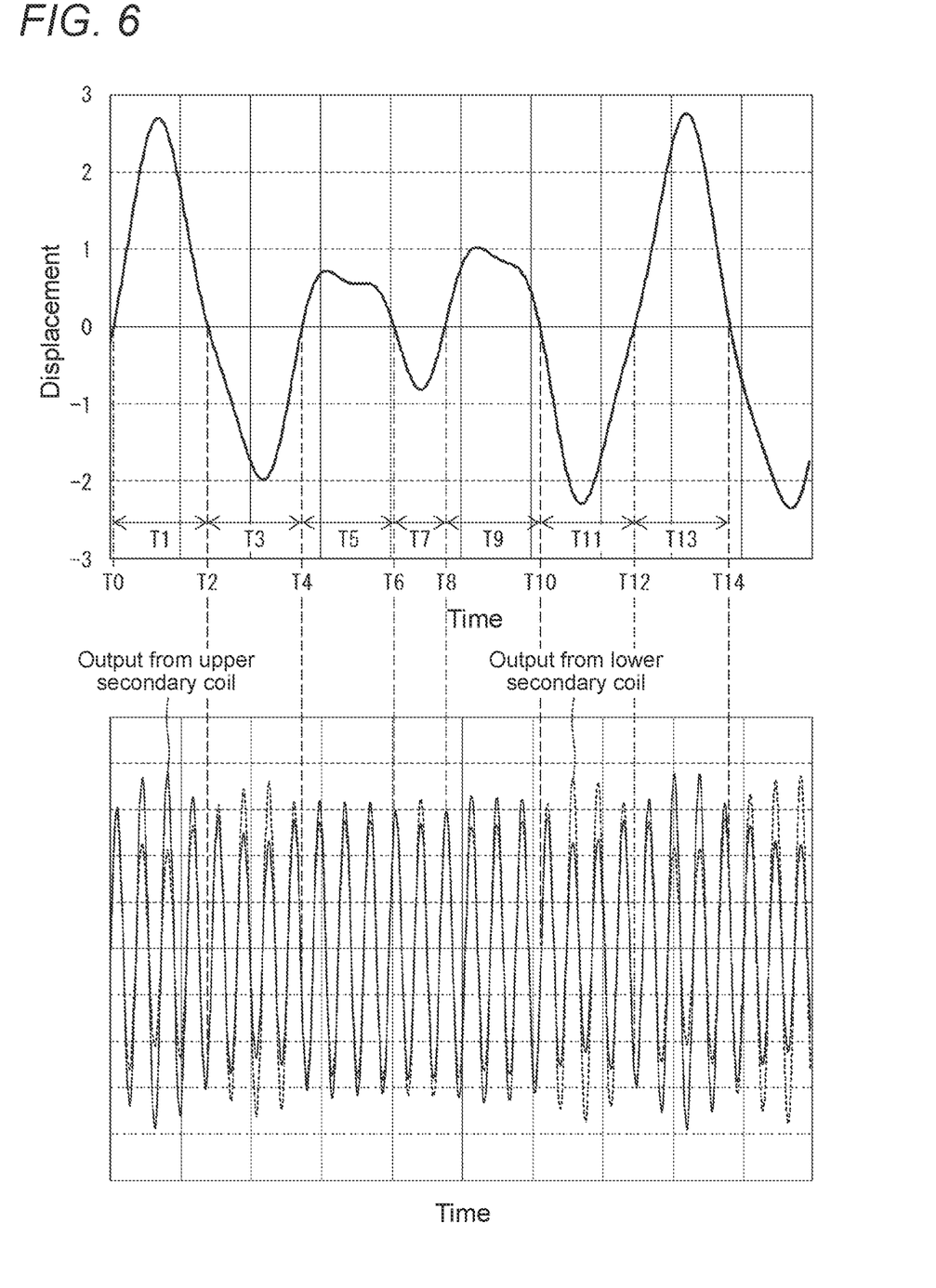
FIG. 6 is a diagram illustrating an exemplary displacement of a movable part and an exemplary voltage signal to be induced in each of an upper secondary coil and a lower secondary coil due to the displacement, in a VCM according to one or more embodiments.

FIG. 6 is a diagram illustrating an exemplary displacement of the movable part 20 and an exemplary voltage signal to be induced in each of the upper secondary coil 12A and the lower secondary coil 12B due to the displacement, in the VCM 1 according to the one or more embodiments. As illustrated in FIG. 6, during times T0, T2, T4, T6, T8, T10, T12, and T14 when the movable part 20 is at the central position and a displacement thereof is zero, an output voltage from (an amplitude in) the upper secondary coil 12A is equal to an output voltage from (an amplitude in) the lower secondary coil 12B.

During times (periods) T1, T5, T9, and T13 when the movable part 20 is displaced higher than the central position, the output voltage from (the amplitude in) the upper secondary coil 12A increases while the output voltage from (the amplitude in) the lower secondary coil 12B decreases.

During times (periods) T3, T7, and T11 when the movable part 20 is displaced lower than the central position, the output voltage from (the amplitude in) the lower secondary coil 12B increases while the output voltage from (the amplitude in) the upper secondary coil 12A decreases.

(Control Blocks of VCM 1)

Figure 7:
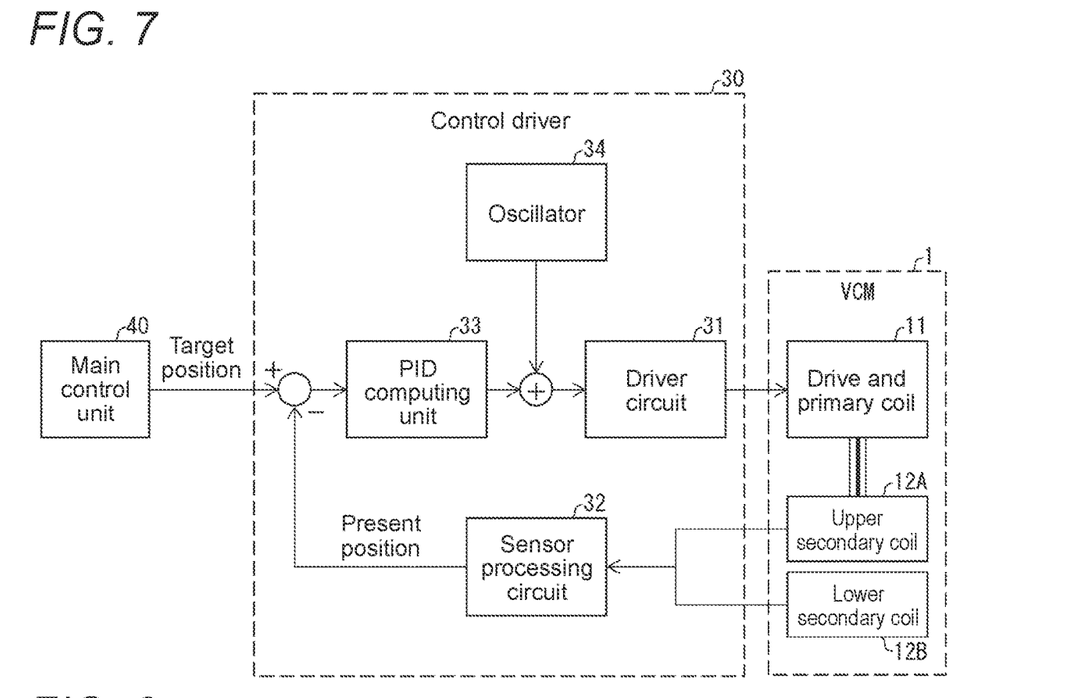
FIG. 7 is a control block diagram illustrating a VCM and a control driver according to one or more embodiments.

FIG. 7 is a control block diagram illustrating the VCM 1 and a control driver 30 according to the one or more embodiments. The control driver 30 is a drive control device configured to drive the VCM 1. The control driver 30 receives a target position of the movable part 20 from the main control unit 40. The control driver 30 drives the VCM 1 to move the movable part 20 to the target position. The main control unit 40 is, for example, a control device for stage effects, installed in a game machine.

The control driver 30 includes a driver circuit (a drive unit) 31, a sensor processing circuit (a processing unit) 32, a proportional integral derivative (PID) computing unit (a correction unit) 33, and an oscillator 34.

The oscillator 34 generates a high-frequency current F for displacement detection. The driver circuit 31 amplifies a signal that includes a signal received from the main control unit 40, the signal indicating the target position of the movable part (the movable side) 20 in the VCM 1, and a high-frequency current superimposed on the signal, the high-frequency current being generated by the oscillator 34, and supplies the signal thus amplified to the drive and primary coil 11. The drive current C is obtained by amplifying the signal indicating the target position, and the high-frequency current F is superimposed on the drive current C (see FIG. 3).

The sensor processing circuit 32 receives voltage signals output from the upper secondary coil 12A and lower secondary coil 12B in the VCM 1. The sensor processing circuit 32 outputs a present position signal indicating a present position proportional to the displacement of the movable part 20, based on the voltage signals received from the upper secondary coil 12A and lower secondary coil 12B. In other words, the sensor processing circuit 32 outputs a position signal indicating a position of the movable part 20, based on the voltage signals received from the upper secondary coil 12A and lower secondary coil 12B.

The PID computing unit 33 corrects a signal indicating a target position to be input to the driver circuit 31, based on a position signal output from the sensor processing circuit 32. The PID computing unit 33 receives a difference between a target position transmitted from the main control unit 40 and a present position indicated by a present position signal. The PID computing unit 33 subjects the difference between the target position and the present position to proportional integral derivative computation to output a signal indicating a result of the computation for moving the movable part 20 to the target position (a signal indicating the corrected target position). The PID computing unit 33 sends the signal indicating the result of the computation to the driver circuit 31 in a state in which the high-frequency current F generated by the oscillator 34 is superimposed on the signal.

The driver circuit 31 receives the signal indicating the result of the computation to which the high-frequency current F is added, from the PID computing unit 33, subjects the signal to power amplification to generate a drive current on which the high-frequency current F is superimposed, and supplies the drive current to the drive and primary coil 11 of the VCM 1. The movable part 20 is thus accurately moved to the target position.

In some embodiments, the high-frequency current F generated by the oscillator 34 may have a frequency higher than a response frequency of the VCM 1, which enables highly accurate position control since the superimposed high-frequency current F causes no displacement of the VCM 1.

(Advantageous Effects of VCM 1)

According to the configuration described above, the drive and primary coil 11 serves as the drive coil of the VCM 1, and also serves as the primary coil of the displacement sensor 9 including the differential transformer, and the high-frequency current F for detecting a position of the movable part 20 is superimposed on the drive current C. In addition, the yoke and iron-core 8 serves as the yoke movable integrally with the permanent magnet 7 of the VCM 1, and also serves as the iron core of the displacement sensor 9. With the above-described configuration, the VCM 1 that includes the displacement sensor 9 incorporated therein is capable of outputting a signal indicating a position of the movable part 20, by addition of the upper secondary coil 12A and the lower secondary coil 12B, thus enabling position feedback control.

Since the displacement sensor 9 includes a component of a VCM, reductions in outer shape and cost are achieved as compared with a case where a separate component such as a displacement detector or a capacitive sensor is externally provided.

Each of the upper secondary coil 12A and the lower secondary coil 12B for detection includes the magnet wire wound around the bobbin around which the drive and primary coil 11 is also wound, enabling an integrated structure with the VCM main body unlike a configuration in which a scale or the like is fastened with screws. Therefore, mount error that may be caused in a configuration in which a displacement detector, a capacitive sensor, or the like is externally mounted to a VCM main body may be prevented and higher detection accuracy can be achieved. In addition, the above described configuration essentially eliminates error factors such as a positional deviation owing to secular variation.

According to the foregoing configuration, the upper secondary coil 12A and the lower secondary coil 12B are wound around the outer periphery of the drive and primary coil 11 while being placed on top of the other. Accordingly, the displacement sensor 9 is incorporated in the VCM 1 without changing the axial size of the outer shape of the VCM 1.

Alternatively, the two secondary coils 12A and 12B may be wound around two axial ends of the drive and primary coil 11. Accordingly, the displacement sensor 9 is incorporated in the VCM 1 without changing the radial size of the outer shape of the VCM 1.

(Gimmick Device Including VCM 1)

FIG. 8 is a perspective view of the gimmick device 50 including the VCM 1. The gimmick 51 in the form of a duck is mounted on an upper surface of the casing 6 of the movable part 20. FIG. 9 is a diagram illustrating an image of movement of the gimmick 51 based on the displacement of the movable part 20 in the gimmick device 50.

The VCM 1 outputs a signal indicating a position of the movable part 20. The control driver 30 is therefore capable of position feedback control using the signal. As a result, the movable part 20, that is, the gimmick 51 is accurately moved to a target position even when a load weight varies due to variations in weight of the members (the gimmick 51, the casing 6, the permanent magnet 7, and the yoke and iron-core 8) in the movable side.

Likewise, the movable part 20, that is, the gimmick 51 is accurately moved to a target position even when the temperature of the permanent magnet 7 rises due to, for example, a change in ambient temperature or self heat generation of the drive and primary coil 11 owing to energization, resulting in decrease of magnetic force.

The accurate movement of the gimmick 51 to the target position enables, for example, a floating operation of the gimmick 51 smoothly moving up and down as if floating on the surface of water as illustrated in FIG. 9.

(Implementable Example Using Software)

The control blocks of the control driver 30 may be implementable using a logic circuit (hardware) including, for example, an integrated circuit (an IC chip) or may be implementable using software.

In the latter case, the control driver 30 includes a computer for executing commands of a program as the software implementing the respective functions. The computer may include, for example, one or more processors and a computer-readable recording medium storing the program. In the computer, the processor reads the program from the recording medium, and executes the program to thereby achieve one or more embodiments as disclosed herein. Examples of the processor may include, but are not limited to, a central processing unit (CPU). Examples of the recording medium may include, but are not limited to, a tape, a disk, a card, a semiconductor memory, and a programmable logic circuit, in addition to a non-transitory tangible medium such as a read only memory (ROM). The computer may further include, for example, a random access memory (RAM) that develops the program. The program may be supplied to the computer via any transmission medium (e.g., a communication network, a broadcast wave) capable of transmitting the program. One or more embodiments may be implemented in the form of a data signal embedded in a carrier wave, as the program embodied by electronic transmission.

The one or more embodiments of the foregoing disclosure is not intended to be limiting. Various changes may be made without departing from the scope presently disclosed or hereafter claimed. One or more embodiments obtained by appropriately combining technical features disclosed respectively in one or more different embodiments is also embraced in the intended technical scope.

The invention claimed is:

1. A voice coil motor comprising:
 a casing having a bottom end-closed cylindrical shape;
 a permanent magnet having a cylindrical outer peripheral face, and being disposed on a central bottom portion in the casing;
 a yoke disposed opposite the permanent magnet in the casing, and being equal in diameter to the permanent magnet;
 a bobbin; and
 a coil part wound around the bobbin, wherein
 the coil part comprises:
  a drive and primary coil serving as a drive coil and a primary coil of a differential transformer, the drive and primary coil being interlinked with a magnetic flux by the permanent magnet; and two secondary coils of the differential transformer, and the yoke is disposed in a central space defined in the coil part, and serves as an iron core of the differential transformer.

2. The voice coil motor according to claim 1, wherein the two secondary coils are wound around an outer periphery of the drive and primary coil while being placed on top of the other.

3. A drive control device for the voice coil motor according to claim 2, the drive control device comprising:
an oscillator configured to generate a high-frequency current;
a drive unit configured to amplify a signal that comprises a signal indicating a target position of a movable side in the voice coil motor and the high-frequency current superimposed on the signal, the high-frequency current being generated by the oscillator, and to supply the signal thus amplified to the drive and primary coil;
a processing unit configured to receive voltages to be induced in the two secondary coils of the voice coil motor, and to output a position signal indicating a position of the movable side, based on each of the voltages; and
a correction unit configured to correct a signal indicating the target position, the signal being input to the drive unit, based on the position signal output from the processing unit.

4. The drive control device according to claim 3, wherein the high-frequency current has a frequency higher than a response frequency of the voice coil motor.

5. The voice coil motor according to claim 1, wherein the two secondary coils are wound around axial two ends of the drive and primary coil.

6. A drive control device for the voice coil motor according to claim 5, the drive control device comprising:
an oscillator configured to generate a high-frequency current;
a drive unit configured to amplify a signal that comprises a signal indicating a target position of a movable side in the voice coil motor and the high-frequency current superimposed on the signal, the high-frequency current being generated by the oscillator, and to supply the signal thus amplified to the drive and primary coil;
a processing unit configured to receive voltages to be induced in the two secondary coils of the voice coil motor, and to output a position signal indicating a position of the movable side, based on each of the voltages; and
a correction unit configured to correct a signal indicating the target position, the signal being input to the drive unit, based on the position signal output from the processing unit.

7. The drive control device according to claim 6, wherein the high-frequency current has a frequency higher than a response frequency of the voice coil motor.

8. A drive control device for the voice coil motor according to claim 1, the drive control device comprising:
an oscillator configured to generate a high-frequency current;
a drive unit configured to amplify a signal that comprises a signal indicating a target position of a movable side in the voice coil motor and the high-frequency current superimposed on the signal, the high-frequency current being generated by the oscillator, and to supply the signal thus amplified to the drive and primary coil;
a processing unit configured to receive voltages to be induced in the two secondary coils of the voice coil motor, and to output a position signal indicating a position of the movable side, based on each of the voltages; and
a correction unit configured to correct a signal indicating the target position, the signal being input to the drive unit, based on the position signal output from the processing unit.

9. The drive control device according to claim 8, wherein the high-frequency current has a frequency higher than a response frequency of the voice coil motor.

* * * * *